(12) United States Patent
De Kalbermatten et al.

(10) Patent No.: US 12,493,767 B2
(45) Date of Patent: Dec. 9, 2025

(54) TOOL INSERT FOR A MACHINE, MACHINE, AND METHOD FOR OPERATING A MACHINE

(71) Applicant: BOBST MEX SA, Mex (CH)

(72) Inventors: Alexandre De Kalbermatten, Tartegnin (CH); Alexandre Volery, Fey (CH)

(73) Assignee: BOBST MEX SA, Mex (CH)

( * ) Notice: Subject to any disclaimer, the term of this patent is extended or adjusted under 35 U.S.C. 154(b) by 357 days.

(21) Appl. No.: 17/759,750

(22) PCT Filed: Feb. 2, 2021

(86) PCT No.: PCT/EP2021/052412
§ 371 (c)(1),
(2) Date: Jul. 29, 2022

(87) PCT Pub. No.: WO2021/160472
PCT Pub. Date: Aug. 19, 2021

(65) Prior Publication Data
US 2023/0065113 A1 Mar. 2, 2023

(30) Foreign Application Priority Data
Feb. 13, 2020 (EP) .................................. 20020066

(51) Int. Cl.
*G06K 19/07* (2006.01)
*B65B 57/18* (2006.01)
(Continued)

(52) U.S. Cl.
CPC .......... *G06K 19/0723* (2013.01); *B65B 57/18* (2013.01); *G05B 19/0425* (2013.01); *B65B 43/10* (2013.01)

(58) Field of Classification Search
CPC ...... G05B 19/0425; G05B 2219/31095; G05B 2219/49302; G05B 2219/49304; G06K 19/0723; B23Q 17/2457; B23Q 17/2471
See application file for complete search history.

(56) References Cited

U.S. PATENT DOCUMENTS

2003/0060901 A1* 3/2003 Mailliet ............. G05B 23/0289
700/21
2011/0218668 A1* 9/2011 Morfino ............... G05B 19/401
700/174
(Continued)

FOREIGN PATENT DOCUMENTS

CN 1224648 A 8/1999
CN 201325969 Y * 10/2009
(Continued)

OTHER PUBLICATIONS

Mimaki Global, "Features of Creasing roller/plate", (Feb. 28, 2018), URL: https://web.archive.org/web/20180228215611/https://mimaki.com/topics/supply/cutter/roller-plate.html#prettyPhoto, p. 1-2 (Year: 2018).*

(Continued)

*Primary Examiner* — Mong-Shune Chung
(74) *Attorney, Agent, or Firm* — Bookoff McAndrews, PLLC

(57) ABSTRACT

A tool insert for a machine, in particular a cutting, punching and/or folding machine, is disclosed. The tool insert (24) has an identification element (38) comprising tool information about the type of the tool insert (24) and/or about the area of application of the tool insert (24). The identification element (38) is machine-readable such that the tool information is transmitted to the machine when the machine reads out the identification element. Further, a machine, a machine system and a method for operating a machine are disclosed.

18 Claims, 3 Drawing Sheets

(51) Int. Cl.
*G05B 19/042* (2006.01)
*B65B 43/10* (2006.01)

(56) References Cited

U.S. PATENT DOCUMENTS

| | | | | |
|---|---|---|---|---|
| 2011/0303054 | A1* | 12/2011 | Cattaneo | B25B 23/1425 |
| | | | | 81/479 |
| 2015/0122520 | A1 | 5/2015 | Rola et al. | |
| 2017/0044875 | A1* | 2/2017 | Hebebrand | E21B 19/14 |
| 2017/0320183 | A1* | 11/2017 | Rola | B23Q 17/2457 |
| 2018/0039807 | A1* | 2/2018 | O'Brien | G06K 7/10297 |
| 2018/0178366 | A1* | 6/2018 | Matei | B25B 21/00 |
| 2020/0166909 | A1* | 5/2020 | Noone | G06N 20/00 |
| 2020/0183347 | A1* | 6/2020 | Dijkhoff | G05B 19/4185 |
| 2020/0246926 | A1* | 8/2020 | Rempfler | B26D 5/00 |
| 2020/0405313 | A1* | 12/2020 | Shelton, IV | H02J 7/00045 |
| 2021/0101253 | A1* | 4/2021 | Hoshikawa | B24B 53/12 |
| 2021/0334486 | A1* | 10/2021 | De Oliveira | G06K 19/07786 |
| 2022/0253662 | A1* | 8/2022 | Niino | G06K 19/07749 |
| 2024/0051041 | A1* | 2/2024 | Schaefer | A61C 13/0004 |

FOREIGN PATENT DOCUMENTS

| | | | | |
|---|---|---|---|---|
| CN | 108287526 A | | 7/2018 | |
| DE | 102012202116 A1 | * | 8/2013 | ............ B23Q 17/09 |
| DE | 102016211937 A1 | * | 1/2018 | |
| JP | 2003071672 A | | 3/2003 | |
| JP | 2009050979 A | | 3/2009 | |
| JP | 2013022650 A | | 2/2013 | |
| JP | 2013546079 A | | 12/2013 | |
| WO | 2016174445 A1 | | 11/2016 | |

OTHER PUBLICATIONS

Marbach Group, "crease plate die", (Aug. 2, 2018), "https://www.marbach.com > product-pdf", p. 1-4 (Year: 2018).*

European Patent Office, International Search Report, PCT/EP2021/052412, May 11, 2021, 3 pages, Europe.

Grosch, Thomas & Metternich, Joachim & Abele, Eberhard & Schaupp, Eva & Landfried, Kim-Carolin & Großkurth, Dominik & Hofmann, Klaus & Wieschollek, Matthias & Ebben, Alexander & Schloen, Jan & Zieglrtum, Franz & Gutmacher, Martin & Schwennig, Bernd. "Intelligente Werkzeuge für die vernetzte Produktion von morgen—SmartTool (Abschlussbericht). Abschlussbericht des BMBF Verbundprojekts SmartTool." (Intelligent Tools for the Networked Production of Tomorrow SmartTool. Final report.

* cited by examiner

TOOL INSERT FOR A MACHINE, MACHINE, AND METHOD FOR OPERATING A MACHINE

CROSS-REFERENCE TO RELATED APPLICATION(S)

This patent application is a National Stage Application under of 35 U.S.C. § 371 of International Patent Application No. PCT/EP2021/052412, filed on Feb. 2, 2021, which claims priority to European Application No. 20020066.5, filed on Feb. 13, 2020, the entireties of which are incorporated herein by reference.

The invention generally relates to a tool insert for a machine. The invention further relates to a machine, to a machine system and to a method for operating a machine.

For the production of packaging, it is known to use machines which apply creases to a blank such as a sheet, and which cut and/or fold the blank in order to produce a specific type of packaging. For this purpose, the machine is equipped with a tool insert comprising a specific type of tool for the respective packaging to be produced.

The machine can be formed as a device or system, which either is a standalone unit or is integrated into a larger machine or system such as a printing machine or a finishing machine.

Usually, such machines or machine systems can be used to produce different types of packaging from the same or different types of blanks by exchanging the tool insert to an appropriate one for the specific product to be produced.

In addition to a change of the tool insert, operational parameters of the machine have to be changed to adapt the machine to the production of the new product. In other words, the operation mode of the machine has to be adapted.

When changing the type of product to be produced, an operator of the machine stops the production of the current product, exchanges the tool insert and manually adapts operational parameters of the machine for the production of the new product. The adaptation of the operational parameters can be rather complicated, because usually there is be a multitude of different products that can be produced by the same machine, resulting in a large set of different operational parameters. Thus, the operator either has to look up the appropriate operational parameters in a database or has to select the operational mode from a large list of operational modes.

During the exchange of the tool insert and during the adaptation of the operational parameters, the production is completely halted, which results in a reduced overall production volume of the machine.

Accordingly, it is desirable to minimize the downtime of the machine for exchanging the tool insert and for adapting the operational parameters of the machine.

The object of the invention is to reduce the downtime of the machine for the exchange of the tool insert and for the adaption of the operational parameters of the machine.

According to the invention, the problem is solved by a tool insert for a machine, in particular a cutting, punching and/or folding machine. The tool insert has an identification element comprising tool information about the type of the tool insert and about the area of application of the tool insert. The identification element is machine-readable such that the tool information is transmitted to the machine when the machine reads out the identification element.

Thus, the tool information is transmitted to the machine automatically when the tool insert is inserted into the machine. Accordingly, the information on the type of the tool insert and about the area of application of the tool insert are automatically transmitted to the machine. In other words, information on the specific type of product that is to be produced are transmitted from the identification element to the machine.

For example, the tool information may comprise an identification code, of the tool insert, particularly an unique identification code of the tool insert, a name of the tool insert, an identification code of a product to be produced, a name of the product to be produced, an identification code of an operational mode of the machine associated with the tool insert, and/or a name of an operational mode of the machine associated with the tool insert.

Usually, the tool inserts are adapted for a specific kind of product. The tool information can be used to quickly adapt the mode of operation of the machine to match the product to be produced. For example, the overall set of operational parameters may be automatically reduced to a subset that is compatible with the specific tool insert, and the subset of operational parameters may be displayed to the operator. Accordingly, the operator only has to choose from a reduced set of matching operational parameters for the machine and can set the operational parameters more quickly.

In addition, the mode of operation of the machine is at least partially set automatically based on the tool information, in particular fully automatic. This results in a considerable reduction of the downtime of the machine.

Examples of parameters which are set based on the tool information can be gaps between feeding rolls, biasing forces for biasing rollers against a substrate, like e.g. sheet or web material, expected length, thickness and/or width of the substrate which is to be processed, sensibility values for sensors in order to accommodate for different reflectivity of processed materials, stacking module to be used, stacking mode mode (continuous or discontinuous), operation of specific sensors depending from the size of the substrate and/or the presence of marking on the processed substrate, displacement of sensors for obtaining a sensible detection based on the expected dimensions of the substrate, etc.

Automatic (at least partial) configuration of the machine is based on the recognition that the tool information about the type of the tool insert implicitly contains information on the set-up of the machine for the particular job for which the tool is being used, because the tools are dedicated to either a single job for a specific material so that a specific set-up of the machine is required, or at least dedicated to a set of very similar jobs so that a basic set-up can be made which then might require some modification.

A warning message may be generated if set operational parameters of the machine do not match the tool insert. For example, the warning message may comprise an acoustic warning, an optical warning and/or a tactile warning. Particularly, the warning message may comprise an alarm sound, a warning message that is displayed on a display of the machine and/or vibrations of an input device that is used by an operator in order to control the machine. The operator may then decide to proceed in spite of the warning message or to exchange the tool insert.

According to an aspect of the invention, the identification element is machine-readable in a contactless manner. Thus, the tool insert does not have to be connected to the machine via cables, connectors, etc., because the tool information is transmitted to the machine in a contactless manner. Accordingly, the tool insert can be exchanged in an easier and quicker way.

Alternatively, the tool insert may comprise a connector, and the tool insert may be connected to a machine via a cable plugged into the connector.

According to another aspect of the invention, the tool information is stored on the identification element electronically and/or optically. Thus, the tool information can be transmitted to the machine via a suitable electronic and/or optical reading device. For this purpose, any suitable electronic and/or optical reading device known in the art may be used.

In an embodiment of the invention, the identification element is established as an RFID chip and/or as an optically readable code. The optically readable code may be a barcode and/or a QR-code. Accordingly, the tool information is transmitted to the machine by reading out the identification element via a suitable RFID communication device and/or an optical scanner, which may be integrated into and/or connected to the machine.

Preferably, the tool information comprises a previous time of use of the tool insert. Most tools have a limited lifetime and need to undergo maintenance after a certain time of use. The previous time of use is transmitted to the machine together with the other tool information, such that maintenance and/or replacement of the tool insert can be scheduled in time. Moreover, operational parameters of the machine may be adapted based on the previous time of use, particularly in order to compensate for wear of the tool insert. For example, a range of motion of the machine and/or a pressure applied by the machine to a blank is adapted based on the previous time of use.

Therein and in the following, the term (remaining) "lifetime" is understood to comprise all of the following: The (remaining) lifetime may be defined by a predetermined number of uses of the tool insert. In other words, the (remaining) lifetime is defined to be a number N of uses of the tool insert. The (remaining) lifetime may also be adaptively calculated based on operational parameters of the machine that are related to a remaining lifetime of the tool insert, particularly based on a pressure applied and/or a range of motion of the machine. Moreover, the (remaining) lifetime may be defined based on statistical analysis of a large set of lifecycles of sample tool inserts.

According to another aspect of the invention, the identification element is machine-writable so that the tool information is changed and/or new tool information is added when the machine writes on the identification element.

For example, modes of operations associated with the tool insert may be adapted and/or new modes of operation associated with the tool insert may be written onto the identification element. This way, the tool insert can be associated with new products to be produced.

Accordingly, an identification code of a product to be produced, a name of the product to be produced, an identification code of an operational mode of the machine associated with the tool insert, and/or a name of an operational mode of the machine associated with the tool insert may be written onto the identification element.

Alternatively or additionally, an updated previous time of use of the tool insert may be written onto the identification element, such that the correct actual time of use of the tool insert is saved on the identification element.

According to the invention, the problem further is solved by a machine, in particular a cutting, punching and/or folding machine, comprising a tool holder and a reading and/or writing device. The tool holder is adapted to receive a tool insert described above. The reading and/or writing device is configured to read out the tool information from the identification element of the tool insert and/or to write tool information on the identification element.

On one hand, the tool information stored on the identification element is transmitted to the machine via the reading and/or writing device, which reads out the identification element. On the other hand, the tool information saved on the identification element is updated and/or new tool information is written onto the identification element via the reading and/or writing device.

Regarding the further properties and advantages of the machine, reference is made to the explanations given above with respect to the tool insert, which also hold for the machine and vice versa.

The reading and/or writing device may be integrated into the machine. Alternatively or additionally, the reading and/or writing device may be an external device that is connected to the machine in a signal transmitting manner. Particularly, the reading and/or writing device is established as a hand-held device that may be operated by a user and/or an operator of the machine. For example, the reading and/or writing device may be established as a hand-held scanner.

According to an aspect of the invention, the machine comprises a control unit, wherein the control unit is adapted to receive the tool information and to automatically set an operation mode of the machine and/or machine operation parameters based on the tool information. Thus, the operator does not need to manually set the operational mode of the machine, but the operational mode and/or the associated operational parameters are at least partially set automatically by the control unit based on the tool information. Particularly, the operational mode and/or the associated operational parameters are set completely automatically by the control unit based on the tool information.

Regarding examples of machine parameters which are automatically set, reference is made to the above comments.

According to another aspect of the invention, different operation modes of the machine and/or different machine operation parameters are stored on a data carrier of the control unit. Thus, the mode of operation of the machine and/or the operational parameters of the machine can automatically be set by the control unit without a need for an external data base.

Alternatively or additionally, the control unit is connected to an external data carrier in a signal transmitting manner, wherein different operating modes of the machine and/or different machine operation parameters are stored on the external data carrier. The external data carrier can be located on a computer, a laptop, a smartphone or any other type of smart device that is connected to the machine or rather to the control unit in a signal transmitting manner, for example via cable or wireless, especially via a local network, WLAN, Bluetooth, internet, etc.

Alternatively or additionally, the data carrier may be located on an external server. Particularly, the machine or rather the control unit may be connected to a cloud computer network.

In general, the different operation modes of the machine and/or the different machine operation parameters stored on the data carrier may be adapted by a user, e.g. by an operator of the machine. Thus, there may be preset operation modes and/or preset machine operation parameters that are associated with a particular machine and/or a particular product to be produced, which may be adapted to suit the particular circumstances. For example, the different operation modes of the machine and/or the different machine operation parameters may be adapted in order to optimize production and/or to correct errors.

According to another aspect of the invention, the reading and/or writing device is adapted to write a time of use the tool insert on the identification element. The reading and/or writing device may write an updated previous time of use of the tool insert onto the tool insert, such that the correct actual time of use of the tool insert is saved on the identification element. Thus, exchange of the tool insert and/or maintenance of the tool insert can be scheduled in time. Moreover, operational parameters of the machine may be adapted based on the previous time of use, particularly in order to compensate for wear of the tool insert. For example, a range of motion of the machine and/or a pressure applied by the machine to a blank is adapted based on the previous time of use.

Alternatively or additionally, the updated previous time of use may be saved on the data carrier of the control unit and/or on the external data carrier together with the tool information of the tool insert. In other words, the previous time of use of that particular tool insert, which is uniquely associated with that particular tool insert, is stored on the machine side.

According to the invention, the problem further is solved by a machine system with a machine described above and a tool insert described above.

Regarding the properties and advantages of the machine system, reference is made to the explanations given above with respect to the tool insert and to the machine, which also hold for the machine system and vice versa.

The machine system may comprise several machines with one or several tool inserts each. The several machines may all be connected via a common cloud network. Particularly, the previous time of use of the individual tool inserts and/or the remaining lifetime of the individual tool inserts may be monitored simultaneously and/or individually via the cloud network.

Additionally or alternatively, operational parameters of the respective machines that are associated with the individual tool inserts may be monitored via the cloud network.

For example, a supplier of the tool insert may be granted access to monitor the previous time of use and thus the remaining lifetime of each of the tool inserts via the cloud network, particularly for quality assurance, statistical purposes and/or commissioning purposes.

According to the invention, the problem further is solved by a method for operating a machine, in particular a machine described above, comprising the following steps:
- inserting a tool insert, in particular a tool insert described above, into a tool holder of the machine, wherein the tool insert comprises an identification element comprising tool information about the type of the tool insert and/or about the area of application of the tool insert;
- reading the tool information via the machine; and
- setting an operation mode of the machine and/or machine operation parameters based on the tool information at least partially in an automated manner.

Regarding the properties and advantages of the method, reference is made to the explanations given above with respect to the tool insert and to the machine, which also hold for the method and vice versa.

According to an aspect of the invention, a time of use of the tool insert is written on the identification element. In other words, an updated previous time of use of the tool insert may be written onto the identification element, such that the correct actual time of use of the tool insert is saved on the identification element. Thus, exchange of the tool insert and/or maintenance of the tool insert can be scheduled in time. Moreover, operational parameters of the machine may be adapted based on the previous time of use, particularly in order to compensate for wear of the tool insert. For example, a range of motion of the machine and/or a pressure applied by the machine to a blank is adapted based on the previous time of use.

According to another aspect of the invention, a user notification and/or a commissioning message is generated when a predefined time of use of the tool insert is reached. In other words, the user is notified when the tool insert reaches its designated lifetime, such that the user may order a new tool insert and/or the tool insert may undergo maintenance in time. Alternatively or additionally, a new tool insert may automatically be ordered via the commissioning message.

The foregoing aspects and many of the attendant advantages of the claimed subject matter will become more readily appreciated as the same become better understood by reference to the following detailed description, when taken in conjunction with the accompanying drawings, wherein:

FIG. 1 schematically shows a machine according to the invention in a top view;

FIG. 2 schematically shows a detailed view of a segment of the machine of FIG. 1 in a side view;

Figure 1:
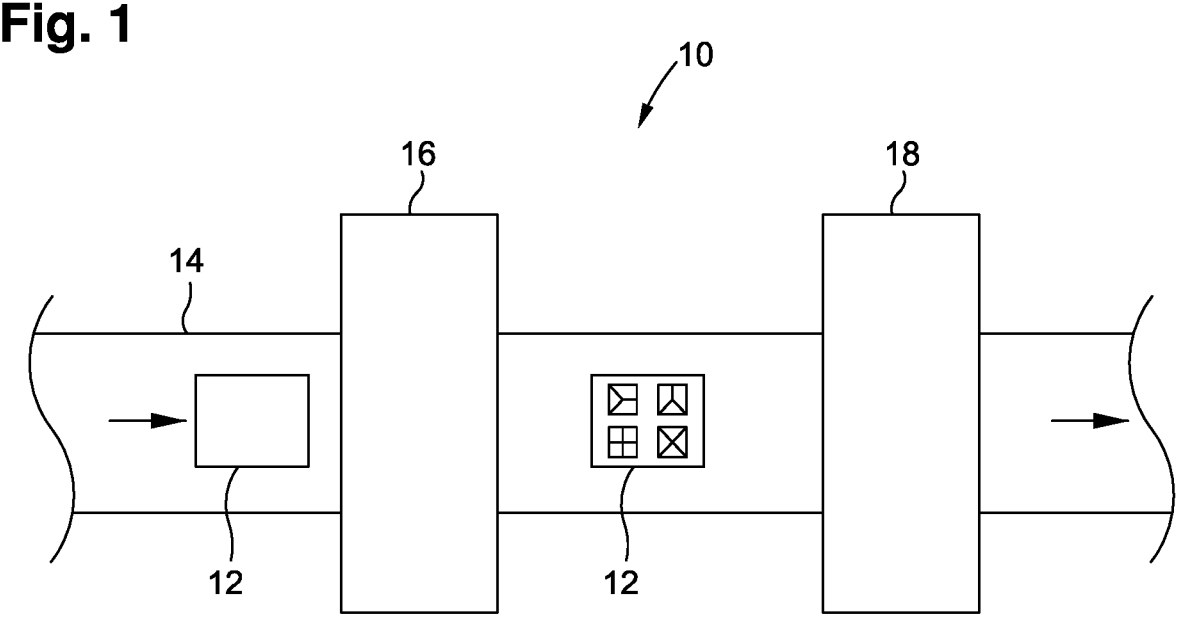

FIG. 1 schematically shows a machine 10 in a top view. In the example described in the following, the machine 10 is established as a folding-, cutting- and/or punching machine.

Alternatively or additionally, the machine 10 may also be established as another type of machine, such as a printing machine or a finishing machine.

The machine 10 is configured to fold, cut and/or punch blanks 12 in a predefined way.

The blanks 12 can be made from cardboard, carton or foil, and may later be processed so as to cut blanks from the substrate, like e.g. sheets or a web to form a package, a box, a wrapping, an envelope, or a similar product.

The machine 10 comprises a transportation system 14 for advancing the blank 12 through a processing area 16 where the blank 12 is processed.

For example, the blank 12 may be cut and/or punched in the processing area 16, and/or folding creases may be applied to the blank 12 in the processing area 16.

At least one additional processing station 18 may be provided as part of the machine 10 or associated therewith. The additional processing station 18 can be used for cutting, folding, gluing or otherwise processing the blanks 12 or articles produced therewith.

The functionality of the machine 10 and of the processing area 16 will be explained in more detail below with reference to FIG. 2. In the following, the example of the machine 10 being a folding machine is described. However, it is to be understood that the explanations given below also hold for the other types of machines described above, possibly with suitable adaptations.

In the processing area 16, a creasing tool and a counter element cooperate so as to apply at least one folding crease to the blank 12.

The creasing tool is established in the form of a plunger 20, which can be advanced towards and pressed against a counter element 22. At plunger 20, a tool insert 24 is mounted in a tool holder 26. To this end, the tool insert carries a creasing plate, the creasing plate being provided with creasing projections. The geometry and arrangement of the creasing projections on the creasing plate corresponds to the folding creases to be applied to the blank 12.

In the specific example of the machine 10 being a folding machine, the tool insert 24 is provided with at least one creasing projection 28. Only a single creasing projection 28 is shown here for increased clarity.

On the side facing the plunger 20, the counter element 22 is provided with a base layer 30, which may be formed from an elastic material such as rubber or an elastomer.

Figure 2:
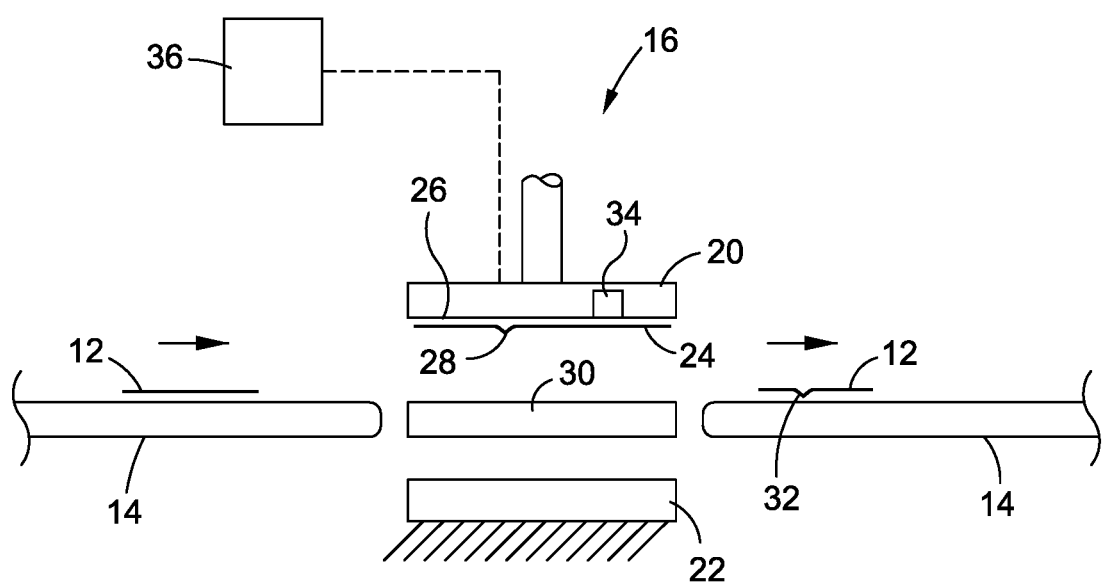

The machine 10 further comprises a reading and/or writing device 34 that, in the specific example of FIGS. 1 and 2, is attached to the plunger 20. The reading and/or writing device 34 is established as an electronic and/or optic device. For example, the reading and/or writing device is established as a RFID communication device and/or as an optical scanner.

Alternatively or additionally, the reading and/or writing device 34 may be an external device that is connected to the machine 10 in a signal transmitting manner, i.e. via cable or in a wireless manner. Particularly, the reading and/or writing device 34 is established as a hand-held device that may be operated by a user and/or an operator of the machine 10. For example, the reading and/or writing device 34 may be established as a hand-held scanner. The precise functionality of the reading and/or writing device 34 will be explained in more detail below.

Moreover, the machine 10 comprises a control unit 36 that is configured to control the machine 10 to process the blanks 12 in a predefined way.

The control unit 36 may be integrated into the machine 10 itself or may be an external device, such as a personal computer, laptop, smartphone or any other kind of smart device. In the latter case, the control unit 36 is connected to the machine 10 in a signal transmitting manner, for example via cable or wireless, especially via a local network, WLAN, Bluetooth, internet, etc.

Generally speaking, the blanks 12 to be provided with a folding crease are advanced via the transportation system 14 so as to be positioned between the plunger 20 and the counter element 22. The plunger 20 is then pressed against the base layer 30 whereby creasing projection 28 creates a folding crease 32 by locally deforming the blank 12.

Usually, the machine 10 can be used to produce different types of products from the same or different types of blanks 12 by exchanging the tool insert 24 to an appropriate one for the specific product to be produced.

Additionally to the tool insert 24, operational parameters of the machine 10 have to be changed to adapt the machine 10 to the production of the new product. In other words, the operation mode of the machine 10 has to be adapted.

For example, a pressure applied to the blank 12 by the plunger 20 and/or a range of motion of the plunger 20 may have to be adapted.

The machine 10 is configured to automatically adapt the operational parameters of the machine 10, i.e. to automatically set the operation mode of the machine 10 to fit the product to be produced.

Generally speaking, this is achieved by an automatic recognition of the tool insert 24. Usually, a specific tool insert 24 is associated with a specific product to be produced or specific set of products to be produced.

Thus, each tool insert may be associated with a unique set of operational parameters of the machine 10. Thus, by automatically recognizing the tool insert 24, the appropriate operational parameters can be set automatically or the overall set of operational parameters of the machine 10 may be automatically reduced to a subset that is compatible with the specific tool insert 24.

The operational parameters can comprise any information relevant for proper operation of the machine for the intended job, such as speed, dimensions and properties of the material to be processed, set-up of mechanical elements such as position of rollers, guides, deflectors, sensors, characteristics of sensors, identification of subcomponents, including spare parts like for example doctor blades for flexographic printing machines, further tooling, lie for example anilox roller, consumables (e.g. paint, ink), periphery equipment, modules used upstream and downstream of the unit where the particular tool is being employed (such as feeders and piling units), etc.

Figure 3:
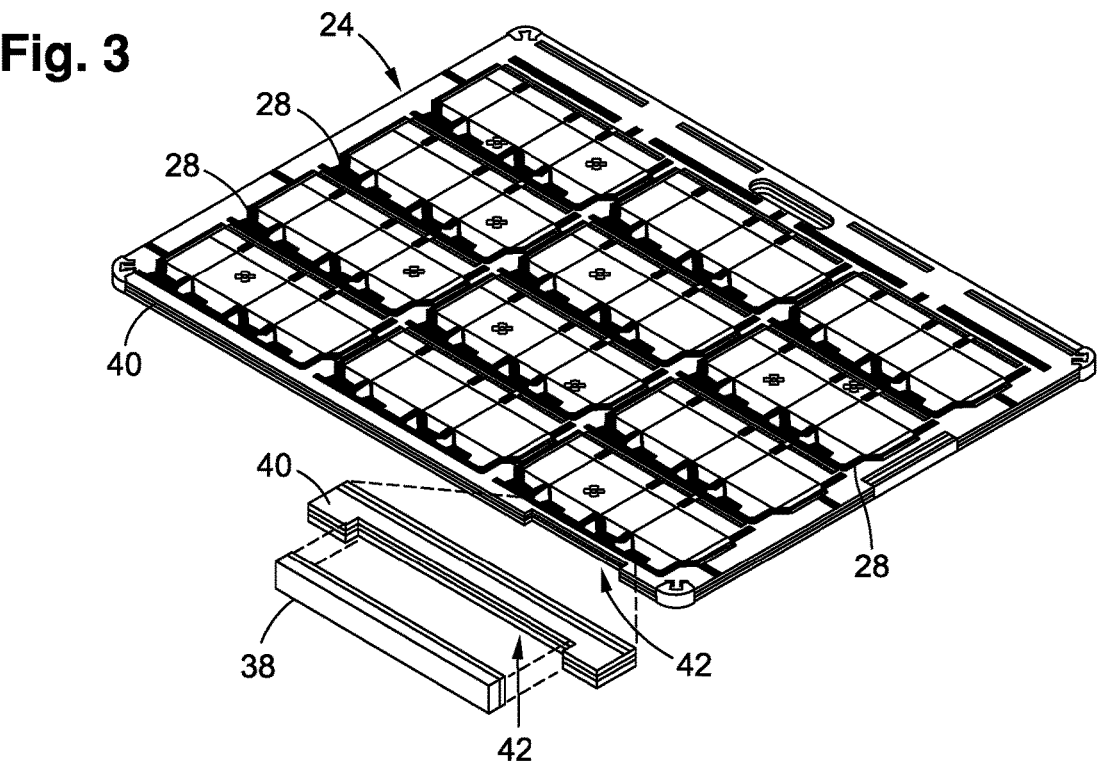
FIG. 3 shows a tool insert for the machine of FIGS. 1 and 2 according to a first embodiment of the invention in a perspective view.

More specifically, the tool insert 24 is modified to comprise a machine-readable identification element 38, which is shown in FIG. 3.

The tool insert 24 comprises a multi-part base plate 40 having several layers, wherein the creasing projections 28 are provided on the top layer of the base plate 40.

In this exemplary embodiment, the identification element 38 is attached to the base plate 40 in a recess 42 in a side of the base plate 40. The identification element 38 may be fixed to the base plate 40 by any suitable connecting means. For example, the identification element 38 may be screwed, glued or clamped into the recess 42.

Preferably, the shape of the identification element 38 is identical to the shape of the recess 42, such that the identification element 38 completely fills the recess 42 with no pieces of the identification element 28 projecting beyond the base plate 40 in the mounted state of the identification element 38.

In the embodiment of FIG. 3, the identification element 38 is established as a RFID chip.

However, it is noted that the identification element 38 may alternatively be established as any other type of medium that is machine-readable in a contactless manner, in particular electronically and/or optically. As an alternative example, the identification element 38 may be established as an optically readable code such as a barcode or a QR code.

Alternatively, the tool insert 24 may comprise a connector, and the tool insert 24 may be connected to the machine 10 via a cable plugged into the connector.

Generally speaking, the identification element 38 comprises information on the tool insert 24. More precisely, at least information on the type of the tool insert 24 and/or about the area of application of the tool insert are electronically and/or optically stored on the identification element 38.

For example, the tool information may comprise an identification code, of the tool insert, particularly an unique identification code of the tool insert, a name of the tool insert, an identification code of a product to be produced, a name of the product to be produced, an identification code of an operational mode of the machine associated with the tool insert, and/or a name of an operational mode of the machine associated with the tool insert.

Moreover, information about the geometry of the tool insert 24, for example about the dimensions of the base plate 40 and/or information on a height and a spatial distribution of the creasing projections 28 may be save on the identification element 28.

Additionally or alternatively, the identification element 38 may comprise information on a previous time of use of the tool insert 24.

Figure 4:
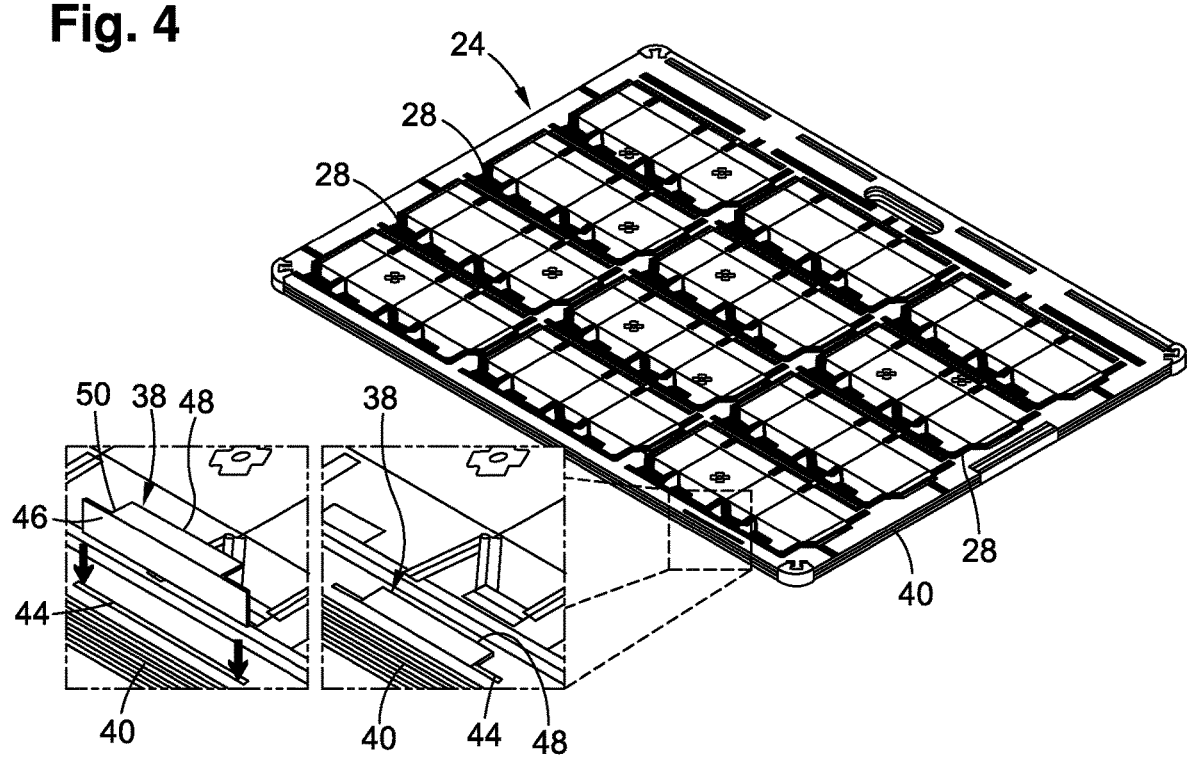
FIG. 4 shows a tool insert for the machine of FIGS. 1 and 2 according to a second embodiment of the invention in a perspective view and FIG. 5 shows a flow chart of a method according to the invention.

FIG. 4 shows another embodiment of the tool insert 24. In the following, only the differences compared to the embodiment of FIG. 3 will be described, wherein components having equal functionality are enumerated with the same reference numerals.

In the embodiment of FIG. 4, the base plate 40 comprises a slit 44 that extends through several layers of the base plate 40.

The identification element 38 comprises an electronic portion 46 and a mounting portion 48 that are connected to each other via a bending portion 50.

The electronic portion 46 comprises the RFID chip and is inserted into the slit 44, such that the RFID chip is located inside the base plate 40. This way, the base plate 40 protects the RFID chip protected from mechanical forces.

The mounting portion 48 is bent with respect to the electronic portion 46 at about 90°.

The mounting portion 48 is fixed to the base plate 40 by any suitable connecting means. For example, the mounting portion 48 may be screwed, glued or clamped onto the base plate 40.

Figure 5:
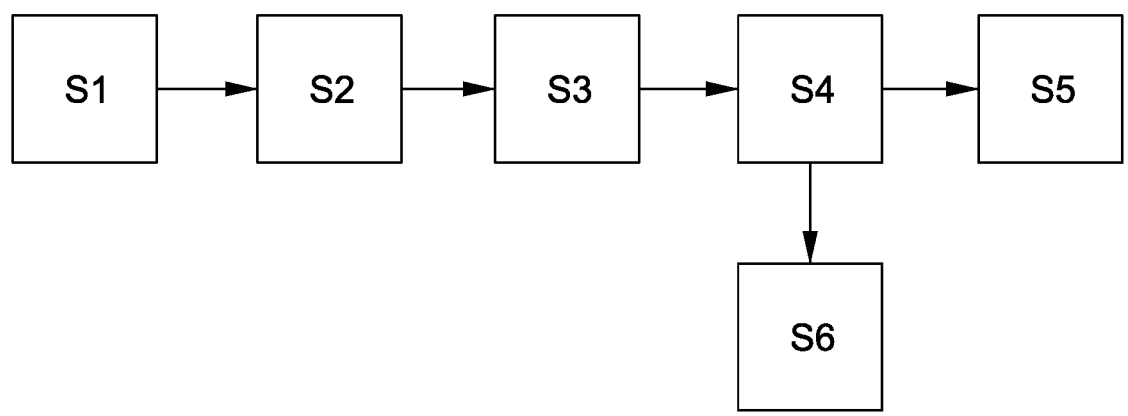

Independent of the particular embodiment of the tool insert 24, the machine 10 is configured to perform the method described in the following with reference to FIG. 5.

More precisely, the control unit 36 is configured to control the machine 10 to automatically perform at least some of the steps described in the following.

First, the tool insert 24 is inserted into the machine 10 (step S1). For example, the tool insert 24 is exchanged because the machine 10 shall be adapted to produce another type of product.

The reading and/or writing device 34 automatically reads out the tool information that is saved on the identification element 38 (step S2). The tool information is transmitted to the machine 10 or rather to the control unit 36.

The control unit 36 sets an operation mode of the machine 10 and the associated operational parameters of the machine 10 at least partially automatic, particularly fully automatic (step S3).

Moreover, operational parameters of the machine 10 may be adapted based on the previous time of use of the tool insert 24, particularly in order to compensate for wear of the tool insert 24. For example, a range of motion of the machine 10 and/or a pressure applied by the machine 10 to the blanks 12 is adapted based on the previous time of use of the tool insert 24.

As already mentioned above, the tool inserts 24 are adapted for a specific kind of product or for a specific set of products.

If the tool insert 24 is only associated with one specific product, the control unit 36 may set all of the operational parameters of the machine 10 fully automatic, because the tool insert 24 is, in that case, uniquely linked with that specific product.

If the tool insert is associated with multiple products, an overall set of operational parameters of the machine 10 may be automatically reduced to a subset that is compatible with the specific tool insert 24 and the associated products.

The subset of operational parameters may be displayed to an operator of the machine 10. Accordingly, the operator only has to choose from a reduced set of matching operational parameters for the machine 10.

The operational parameters of the machine 10 may be stored on a data carrier of the control unit 36. Thus, the mode of operation of the machine 10 and the operational parameters of the machine 10 can automatically be set by the control unit 36 without a need for an external data base.

Alternatively or additionally, the control unit 36 may be connected to an external data carrier in a signal transmitting manner, wherein different operating modes of the machine 10 and/or different machine operation parameters are stored on the external data carrier. The external data carrier can be located on a computer, a laptop, a smartphone or any other type of smart device that is connected to the machine or rather to the control unit in a signal transmitting manner, for example via cable or wireless, especially via a local network, WLAN, Bluetooth, internet, etc. Alternatively or additionally, the data carrier may be located on an external server. Particularly, the machine 10 or rather the control unit 36 may be connected to a cloud computer network.

In general, the different operation modes of the machine 10 and/or the different machine operation parameters stored on the data carrier may be adapted by a user, e.g. by an operator of the machine 10. Thus, there may be preset operation modes and/or preset machine operation parameters that are associated with a particular machine 10 and/or a particular product to be produced, which may be adapted to suit the particular circumstances. For example, the different operation modes of the machine 10 and/or the different machine operation parameters may be adapted in order to optimize production and/or to correct errors.

After the operational parameters of the machine 10 are set, the production of the corresponding product is started.

During the production of the product, the time of use of the tool insert 24 is tracked or rather determined (step S4).

An updated previous time of use of the tool insert 24 is written onto the identification element 38, such that the correct actual time of use of the tool insert is saved on the identification element 38 (step S5).

The updated previous time of use may be written onto the identification element 38 repeatedly after predetermined time intervals and/or at the end of the use of the tool insert 24.

Alternatively or additionally, the updated previous time of use of the tool insert 24 may be saved on the data carrier of the control unit 36 and/or on the external data carrier together with the tool information of the tool insert 24. In other words, the previous time of use of that particular tool insert 24, which is uniquely associated with that particular tool insert 24, is stored on the machine side.

Moreover, a user notification and/or a commissioning message is generated when a predefined time of use of the tool insert 24 is reached (step S6). In other words, the operator is notified when the tool insert 24 reaches its designated lifetime, such that the operator may order a new tool insert 24 and/or the tool insert 24 may undergo maintenance in time.

Alternatively or additionally, a new tool insert 24 may automatically be ordered via the commissioning message.

There may be several machines 10 as described above that together form a machine system, wherein each machine 10 has one or several tool inserts 24 each. The several machines 10 may all be connected via a common cloud network. Particularly, the previous time of use of the individual tool inserts 24 and/or the remaining lifetime of the individual tool inserts 24 may be monitored simultaneously and/or individually via the cloud network.

Additionally or alternatively, operational parameters of the respective machines 10 that are associated with the individual tool inserts 24 may be monitored via the cloud network.

For example, a supplier of the respective tool insert 24 may be granted access to monitor the previous time of use and thus the remaining lifetime of each of the tool inserts 24 via the cloud network, particularly for quality assurance, statistical purposes and/or commissioning purposes.

The invention claimed is:

1. A tool insert for a machine, the tool insert comprising:
an identification element comprising tool information about a type of the tool insert, and information about an area of application of the tool insert,
wherein the identification element is machine-readable such that the tool information and the information about the area of application of the tool insert are automatically transmitted from the identification element to the machine when the machine reads the tool information and the information about the area of application of the tool insert which are stored on the identification element, wherein the identification element includes an electronic portion connected to a mounting portion via a bending portion, and the electronic portion is inserted into a slit in a multi-part base plate that extends through several layers of the multi-part base plate, such that the identification element is located inside the multi-part base plate.

2. The tool insert according to claim 1, wherein the identification element is machine-writable so that the tool information is changed and/or new tool information is added when the machine writes on the identification element.

3. The tool insert according to claim 1, wherein the tool information further includes machine parameters to be set based on a previous time of use, the machine parameters including one or more of: gaps between feeding rolls; stacking module to be used; or stacking mode.

4. The tool insert according to claim 1, wherein the tool insert further comprises a base plate, the base plate including a creasing plate with one or more creasing projections.

5. The tool insert according to claim 1, wherein the tool information includes information about one of more of a specific product to be produced, an identification code of a product to be produced, a name of the product to be produced, an identification code of an operational mode of the machine associated with the tool insert, or a name of an operational mode of the machine associated with the tool insert.

6. The tool insert according to claim 1, wherein the tool information includes a previous time of use of the tool insert for adapting operational parameters of the machine, wherein the operational parameters include a range of motion of the machine and/or a pressure applied by the machine to a blank, which is adapted based on the previous time of use of the tool insert.

7. The tool insert according to claim 1, wherein the tool information includes a previous time of use of the tool insert for adapting operational parameters of the machine, wherein the operational parameters of the machine are adapted to compensate for wear of the tool insert based on the previous time of use of the tool insert.

8. A machine comprising:
a tool holder; and
a reading and/or writing device,
wherein the reading and/or writing device is configured to automatically read out stored tool information and stored information about an area of application of a tool insert from an identification element of the tool insert and/or to write the tool information on the identification element, wherein a user notification and/or a commissioning message is generated when a predefined time of use of the tool insert is reached, wherein the tool information includes information about one of more of a specific product to be produced, an identification code of a product to be produced, a name of the product to be produced, an identification code of an operational mode of the machine associated with the tool insert, or a name of an operational mode of the machine associated with the tool insert, and wherein one or more machine parameters are set based on the tool information, the one or more machine parameters including one or more of: gaps between feeding rolls; stacking module to be used; or stacking mode.

9. The machine according to claim 8, wherein the machine further comprises:
a control unit,
wherein the control unit is adapted to receive the tool information and information about the area of application of the tool insert from the identification element and to automatically set an operation mode of the machine and/or machine operation parameters using the tool information.

10. A method for operating a machine according to claim 8, the method comprising:
inserting the tool insert into the tool holder of the machine;
reading the tool information via the machine; and
adapting an operation mode of the machine and/or one or more machine operation parameters based on the tool information at least partially in an automated manner.

11. The method according to claim 10, wherein the predefined time of use of the tool insert is written on the identification element.

12. The machine according to claim 8, wherein the machine is a cutting, punching, and/or folding machine.

13. A machine system comprising:
a tool insert including an identification element comprising tool information about a type of the tool insert, and information about an area of application of the tool insert;
a machine comprising: a tool holder; and
a reading and/or writing device,
wherein the tool holder is adapted to receive the tool insert, wherein the identification element is machine-readable such that the tool information and the information about the area of application of the tool insert are automatically transmitted from the identification element to the machine when the machine reads the tool information and the information about the area of application of the tool insert which are stored on the identification element, wherein the tool information includes a previous time of use of the tool insert, and the machine is configured to adapt operational parameters based on the previous time of use of the tool insert,
wherein the reading and/or writing device is configured to read out the tool information from the identification element of the tool insert and/or to write the tool information on the identification element, and
wherein a user notification and/or a commissioning message is generated when a predefined time of use of the tool insert is reached, wherein the tool information includes information about one of more of a specific product to be produced, an identification code of a product to be produced, a name of the product to be produced, an identification code of an operational mode of the machine associated with the tool insert, or a name of an operational mode of the machine associated with the tool insert, and wherein one or more machine parameters are set based on the tool information, the one or more machine parameters including one or more of: gaps between feeding rolls; stacking module to be used; or stacking mode.

14. The machine system of claim 13, wherein the tool holder includes a plunger configured to receive the tool insert, wherein the reading and/or writing device is attached to the plunger, and wherein the tool information and the information about the area of application of the tool insert are used to set one or more of a pressure applied to a blank by the plunger or a range of motion of the plunger.

15. The machine system according to claim 13, wherein the tool insert further comprises:
   a multi-part base plate having several layers, wherein the identification element is attached to the multi-part base plate in a recess in a side of the multi-part base plate.

16. The machine system according to claim 15, wherein the multi-part base plate comprises a slit that extends through the several layers of the multi-part base plate.

17. The machine system according to claim 13, further comprising:
   adaptively determining a remaining lifetime of the tool insert based on the operation mode of the machine and/or one or more machine operation parameters, which are adapted based on the previous time of use of the tool insert.

18. The machine system according to claim 13, wherein the operational parameters are adapted based on statistical analysis of a large set of lifecycles of sample tool inserts.

\* \* \* \* \*